J. M. QUINDRY.
SELF WEIGHING DEVICE FOR HAY BALERS.
APPLICATION FILED MAY 31, 1910.
990,004.
Patented Apr. 18, 1911.
2 SHEETS—SHEET 1.
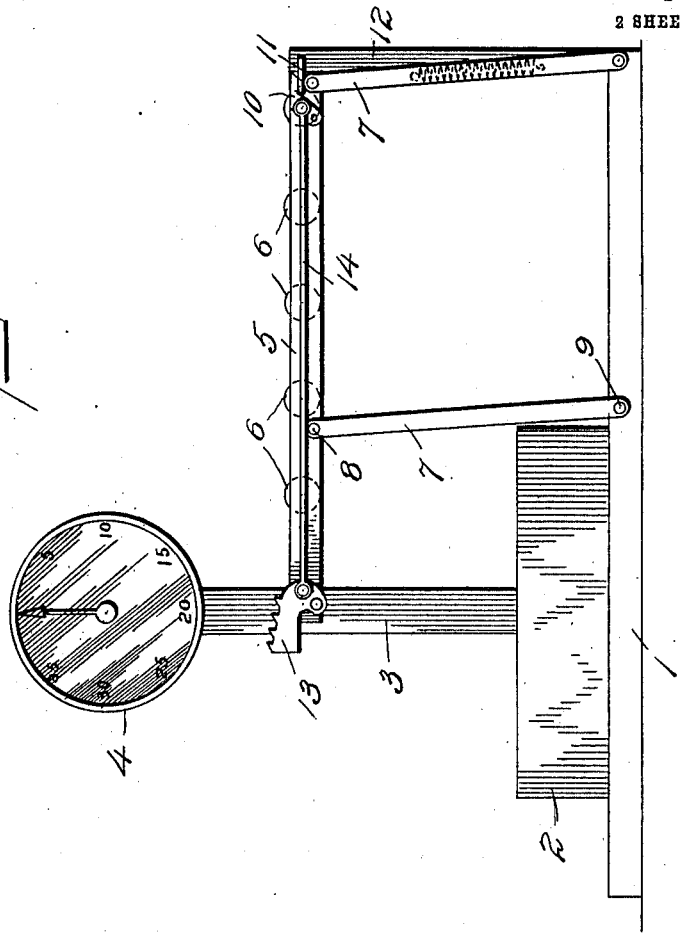
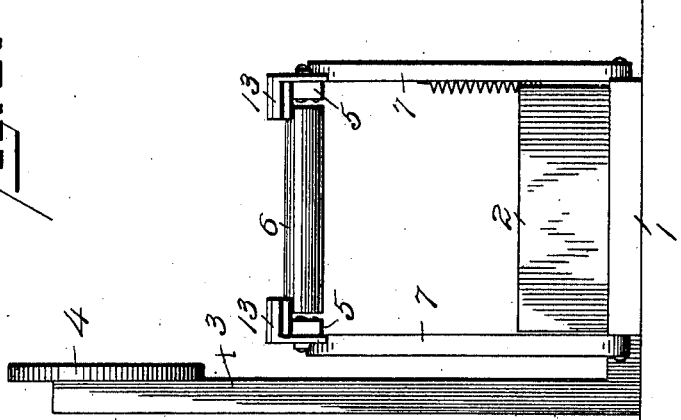

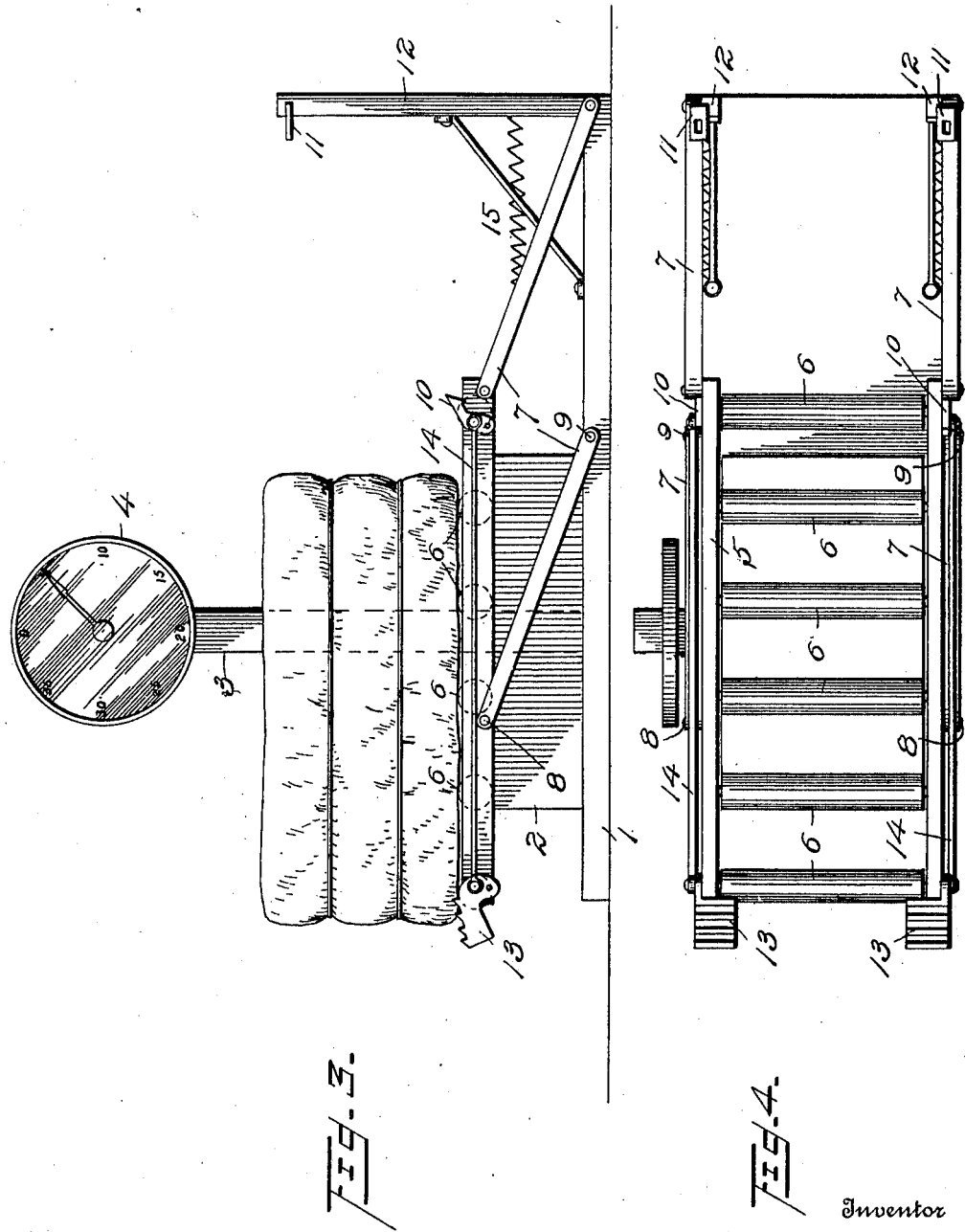

UNITED STATES PATENT OFFICE.

JOHN M. QUINDRY, OF SPRINGERTON, ILLINOIS.

SELF-WEIGHING DEVICE FOR HAY-BALERS.

990,004.  Specification of Letters Patent.  Patented Apr. 18, 1911.

Application filed May 31, 1910. Serial No. 564,330.

*To all whom it may concern:*

Be it known that I, JOHN M. QUINDRY, a citizen of the United States, residing at Springerton, in the county of White and State of Illinois, have invented certain new and useful Improvements in Self-Weighing Devices for Hay-Balers, of which the following is a specification.

This invention relates to an automatic self weighing device for hay or other balers.

The primary object of this invention is to provide a simple and ingenious device of this character which may be attached to a hay, straw, cotton or other baler in position to receive the bales as delivered from the machine and register the weight thereof.

With the foregoing and other objects in view, the invention consists in the novel features of construction, combination and arrangements of parts illustrated in the drawings and more particularly pointed out in the appended claims.

In the accompanying drawings in which like parts are designated by like characters throughout the several views:—Figure 1 is a side elevation of the weighing device in bale receiving position. Fig. 2 is an end elevation of Fig. 1. Fig. 3 is a side elevation of the device with the bale receiving platform in lowered or weighing position, and Fig. 4 is a plan view of Fig. 3.

Referring to the drawings for a more particular description of the device and which are for illustrative purposes only and are therefore not drawn to scale, the device comprises a base 1, upon which is superimposed the platform 2 of the weighing scales 3, comprising in part the standard 3 and the registering dial 4.

The device further comprises the bale receiving frame consisting of the side pieces 5 and a longitudinal series of spaced rollers mounted between the latter. This frame is carried by the upper ends of the supporting standards 7, pivoted at their upper ends, as at 8, to the side pieces of the frame and at their lower ends, as at 9, to the base.

From the foregoing it will be readily determined that the bale receiving frame is capable of swinging in a vertical plane from raised or receiving position into lowered position or vice versa. The aforesaid frame is normally held in raised position by the pivoted latches 10 engaging the recessed keeper plates 11 arranged at or near the upper ends of the standards 12. When the frame is in this position it is in line or in the same horizontal plane with the platform of the base of the baling machine, and as a bale of hay, straw, cotton or the like, as the case may be, is delivered from the baler it is received by the frame and slides over the rollers 6 until it engages and depresses the serrated releasing levers 13, pivoted to the side pieces 5 of the frame and connected with the latches through the medium of the longitudinal links or rods 14. When the releasing levers 13 are thus depressed the latches are thrown out of engaged relation with the keeper plates and the bale receiving frame with its load swings down on the platform of the scales when the weight of the bale is recorded on the dial of the scales. When the bale is removed from the frame, the latter is returned into normal position by the retracting springs 15, connected at opposite ends with the standards 7 and 12, respectively.

From the foregoing description, taken in connection with the drawings it is thought that the construction and operation of the device will be readily understood without requiring a more extended explanation.

Various changes in the form, proportions and minor details of construction may be resorted to without departing from the principles or sacrificing any of the advantages of this invention as defined in the appended claims.

Having described my invention, what I claim as new and desire to secure by Letters Patent, is:—

1. A weighing device of the class specified comprising a base, a bale receiving frame mounted to swing in a vertical plane above the base, a weighing scales mounted on the base to register the weight of a bale, latch devices to normally hold the frame in raised or bale receiving position and means adapted to be engaged by a bale as it is delivered on the frame to release the latch devices in order to permit the frame to swing down into weighing position.

2. In a device of the class specified, a bale receiving frame mounted to swing in a vertical plane above the base, a weighing scales mounted on the base to register the weight of the bales delivered by the machine, latch devices to normally hold the frame in raised or bale-receiving position, means adapted to be engaged by a bale as it is delivered on the frame to release the latch devices to permit the frame to swing down on the platform of the scales and resilient means to return the frame into raised position when the bale is removed.

3. In a device of the class specified, a base, a bale receiving frame mounted to swing in a vertical plane above the base, a weighing scales mounted on the base to register the weight of a bale, latch devices to normally hold the frame in raised position and means adapted to be engaged by a bale as it is delivered on the frame to release the latch devices in order to permit the frame to swing down on the platform of the scales, said means comprising serrated releasing levers pivoted to the frame and means of connection between the levers and latch devices.

4. In a device of the class specified, a base, a bale receiving frame mounted to swing in a vertical plane above the base, a weighing scales mounted on the base to register the weight of the bales, latch devices to normally hold the frame in elevated position, and means engageable by a bale as it is delivered on the frame to release said latch devices in order to permit the bale receiving frame to swing down on the platform of the scales, said means comprising pivoted releasing levers and links between the levers and the latch devices.

5. In a device of the class described, a base, a bale receiving frame mounted to swing in a vertical plane above the base, a longitudinal series of rollers constituting a part of the frame, a weighing scales mounted on the base, latch devices pivoted to the frame and adapted to normally hold the same in elevated or bale-receiving position and means engageable by a bale as it is delivered on the frame to release the latch devices in order to permit the bale receiving frame to swing down on the platform of the scales.

In testimony whereof I affix my signature in presence of two witnesses.

JOHN M. QUINDRY.

Witnesses:
JAMES E. HAMMACK,
CHARLES A. QUINDRY.